(12) United States Patent
Fujita et al.

(10) Patent No.: US 6,760,789 B2
(45) Date of Patent: Jul. 6, 2004

(54) MICROCOMPUTER HAVING TEMPORARY STORAGE FOR RECEIVED DATA AND METHOD OF PROCESSING RECEIVED DATA

(75) Inventors: Yoichi Fujita, Toyoake (JP); Hiroshi Matsuda, Okazaki (JP); Toshihiko Matsuoka, Okazaki (JP)

(73) Assignee: Denso Corporation, Kariya (JP)

( * ) Notice: Subject to any disclaimer, the term of this patent is extended or adjusted under 35 U.S.C. 154(b) by 98 days.

(21) Appl. No.: 10/022,796

(22) Filed: Dec. 20, 2001

(65) Prior Publication Data

US 2002/0147865 A1 Oct. 10, 2002

(30) Foreign Application Priority Data

Jan. 10, 2001 (JP) ........................................ 2001-002615

(51) Int. Cl.⁷ .............................................. G06F 13/00
(52) U.S. Cl. ......................... 710/22; 710/52; 709/250; 709/212; 711/165
(58) Field of Search ................... 710/22–45, 52–57; 709/212, 213, 250; 711/165–168, 141, 156, 105; 370/230

(56) References Cited

U.S. PATENT DOCUMENTS

| | | | | |
|---|---|---|---|---|
| 4,482,951 A | | 11/1984 | Swaney et al. | |
| 5,130,981 A | * | 7/1992 | Murphy | 370/401 |
| 5,822,618 A | * | 10/1998 | Ecclesine | 710/57 |
| 5,870,628 A | * | 2/1999 | Chen et al. | 710/22 |
| 5,943,505 A | * | 8/1999 | Lumpkin et al. | 710/31 |
| 6,061,768 A | * | 5/2000 | Kuo et al. | 711/156 |
| 6,128,715 A | * | 10/2000 | Wang et al. | 711/168 |
| 6,546,464 B2 | * | 4/2003 | Fortuna et al. | 711/141 |

FOREIGN PATENT DOCUMENTS

| | | |
|---|---|---|
| JP | A-58-214938 | 12/1983 |
| JP | B2-2740031 | 9/1991 |

OTHER PUBLICATIONS

*Hitachi 16–bit Single–Chip Microcomputer H8S/2612 Series Hardware Manual*, 2$^{nd}$ Edition Jan. 24, 2001, pp. 95–118.

* cited by examiner

Primary Examiner—Christopher B. Shin
(74) Attorney, Agent, or Firm—Posz & Bethards, PLC

(57) ABSTRACT

A first receiving message is stored in a message box and a CPU reads the first receiving message from the message box. Meanwhile, a second receiving message is once stored in the message box and thereafter transferred directly to a RAM by a DMA controller. The number of times of transfer operation is restricted with an upper limit value. The CPU does not read the second receiving message from the message box but from the RAM and executes the processes based on the message. Generation of failure in the receiving data fetching processes is reduced without physical expansion of the storage regions of the message box.

16 Claims, 4 Drawing Sheets

MICROCOMPUTER HAVING TEMPORARY STORAGE FOR RECEIVED DATA AND METHOD OF PROCESSING RECEIVED DATA

CROSS REFERENCE TO RELATED APPLICATION

This application is based on Japanese Patent Application No. 2001-2615 filed on Jan. 10, 2001 the contents of which are incorporated herein by reference.

BACKGROUND OF THE INVENTION

1. Field of the Invention

The present invention relates to a microcomputer having a function for receiving data and a processing method for received data.

2. Description of the Related Art

It is now an ordinary matter that data communications are conducted among a plurality of microcomputers. For example, a vehicle is usually loaded with electronic control units (hereinafter referred to as ECUs) in the engine drive system, running safety system, entertainment system and other various functional systems to constitute thereby a mobile computer system. Therefore, data communications among such ECUs are effective to realize the optimum control in various systems of a vehicle. For such data communications, there is provided a constitution in which the ECUs loaded in various functional systems are mutually connected via a network such as intra-vehicle LAN (Local Area Network).

SUMMARY OF THE INVENTION

As shown in FIG. 4, for example, an ECU 100 is loaded in a vehicle. An ordinary ECU is provided with an input/output circuit and a microcomputer but it is also provided for network communication with a driver 110 connected to a LAN 90 as one of the input/output circuit. A microcomputer 120 of the ECU 100 includes a CPU 130, a ROM 140, a RAM 150 and a LAN block 160. The LAN block 160 has a function to fetch communication data from the intra-vehicle LAN 90 via a driver 110 and moreover to transmit the communication data to the intra-vehicle LAN 90.

Reception of the communication data via the LAN block 160 will be explained in further detail. The LAN block 160 is provided with a message box 160a, a protocol controller 160b and a filter circuit 160c. In this example, the message box 160a has sixteen blocks. The communication data of the intra-vehicle LAN 90 is constituted of identification information (hereinafter referred to as "ID") indicating an address of transmission source ECU and a kind of data or the like and communication data itself and thereby it is called a message. The message box 160a has a structure to store the ID and data itself in pair. In FIG. 4, each message box 160a is given the numbering from "0" to "15" for the convenience of explanation.

A message fetched by the driver 110 from the network is first decoded by the protocol controller 160b and is selected by the filter circuit 160c. The filter circuit 160c is a logic circuit to select the message based on the ID explained above. Thereby, the message is stored in any one of the message box 160a given the numbering from "0" to "15".

The CPU 130 reads the message from the message box 160a on the basis of an interruption signal indicating message reception from the LAN block 160 and stores this message, for example, to the RAM 150 in order to execute the process depending on such message. However, the CPU 130 does not operate depending on only the message from the intra-vehicle LAN 90 and operates depending on the signals from the other input circuits. Accordingly, the CPU 130 preferentially executes the process which is in the higher real-time processing level by conducting the process change-over operation such as the task dispatch or the like. As a result, when the process priority of the message received is relatively lower, even if the interruption signal is received, the message cannot always be obtained immediately from the message box 160a.

Meanwhile, a communication rate has been much improved in the intra-vehicle LAN 90. For example, this communication rate has reached several Mbps. Therefore, here is generated an event that the next message is received before the CPU 130 fetches a message from the one message box 160a and thereby the next message is over-written in the message box 160a during the fetching process of message. That is, the CPU 130 accidentally generates, in a certain case, a failure of the message fetching process. Such failure of the message fetching process is not desirable from the viewpoint of performance of the CPU 130 because it surely results in deterioration of control performance thereof. For prevention of the failure of the message fetching process, it is very effective that a plurality of message boxes are assigned, for example, to store groups of the messages having comparatively lower process priority and the messages are stored in the vacant storage areas among a plurality of message boxes. In FIG. 4, thirteen message boxes 160a which are identified with the numbering from "1" to "13" are assigned, for example, for the groups of messages having comparatively lower process priority, the messages are selected by the filter circuit 160c and the selected messages are stored in the vacant message boxes 160a among the thirteen message boxes 160a. Thereby, if a delay time is generated in the read operation of message by the CPU 130, generation of the failure in the message fetching process is reduced because the thirteen messages in maximum are stored.

However, since the number of message boxes is restricted, the message boxes are probably used completely when the received messages are spread to various kinds of data and the communication rate is comparatively higher. Here, it is considered to increase the number of message boxes to provide a countermeasure, but it is actually difficult to realize because of the following reasons. The required number of message boxes is different depending on the frequency of message reception and moreover on the number of messages as the reception object. Accordingly, the structure of the LAN block becomes large in size and thereby a size of the ECU becomes large when the there is no limit to the number of message boxes used for a particular application. In addition, expansion in size of the message box is related only to expansion of a communication function and does not make any contribution to improvement of flexibility of a microcomputer itself. Therefore, such expansion of the message box results in an increase in manufacturing costs.

An object of the present invention is to overcome the problems explained above.

Another object of the present invention is to reduce generation frequency of failure in the communication data fetching process.

The other object of the present invention is to eliminate occurrence of such failure in the communication data fetching process.

The still other object of the present invention is to reduce generation frequency of failure in the communication data fetching process without any expansion of storage region of a data storage means, for example, a message box.

According to a profile of the present invention, a microcomputer is provided with a communication means, a data storage means and a process executing means. Moreover, a transfer means transfers communication data stored in the particular storage region of the data storage means. A transfer destination is selected to a temporary storage means which is used by the process executing means. This transfer means transfer the communication data directly without passing the process executing means in a manner that the storage region of the transfer destination is never overlapped. The process executing means basically reads the communication data from the data storage region to execute the processes based on the relevant communication data but executes the processes based on the communication data stored in the particular storage region depending on the communication data stored in the temporary storage means. Since the transfer process is executed without the process executing means, the transfer process can be done independent of various processes executed by the process executing means. Moreover, since communication data is transferred without any overlapping of the storage region in the transfer destination, over-writing of communication data is prevented during the transfer operation of communication data.

The communication means is provided with at least a data receiving function. Moreover, the communication means is permitted to include both receiving function and transmission function. The transfer process can be executed during the period until the next communication data is over-written from the time when the communication data is stored in the particular storage region of the data storage means.

Here, the number of times of communication data transfer may be limited in view of preventing that the transfer data excessively occupies the storage region of the temporary storage means. Moreover, it is possible to introduce the construction to notify the number of times of transfer or that the number of times of transfer has reached the preset value. In addition, information to control the notification process may be held in the transfer means. Further, it is possible to form a constitution to change the upper limit value in the number of times of transfer and the preset value from the process executing means.

BRIEF DESCRIPTION OF THE DRAWINGS

Features and advantages of embodiments will be appreciated, as well as methods of operation and the function of the related arts, from a study of the following detailed description, the appended claims, and the drawings, all of which from a part of this application. In the drawings:

DESCRIPTION OF THE PREFERRED EMBODIMENTS

A preferred embodiment of the present invention will be explained with reference to the accompanying drawings. In this embodiment, the present invention has been adapted to a control system loaded to a vehicle.

Figure 1:
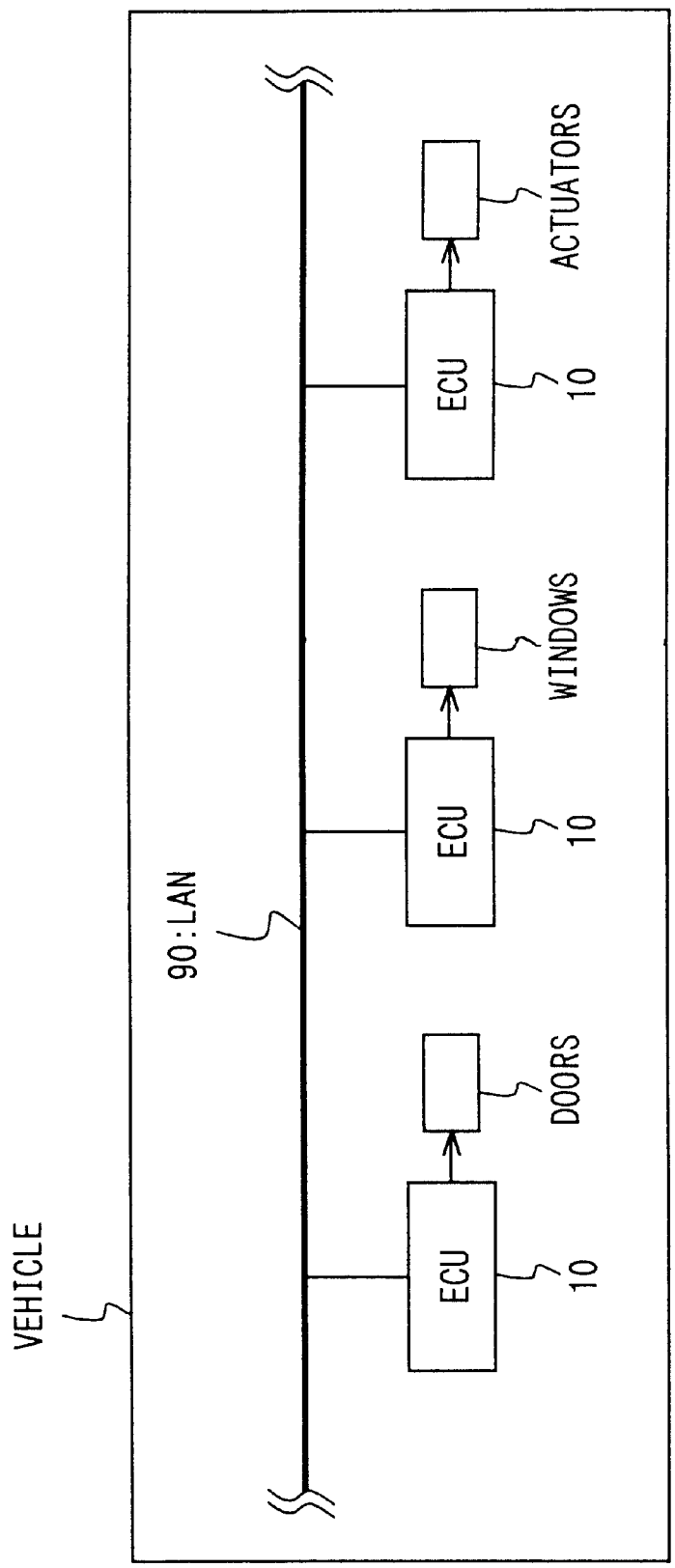
FIG. 1 is a block diagram of a control system of a vehicle according to a first embodiment of the present invention.

In FIG. 1, the control system is loaded to a vehicle. This control system comprises a plurality of ECUs 10 and intra-vehicle LAN 90 to realize data communication among the ECUs 10. Each ECU 10 controls various control objects, for example, doors and windows. For example, an ECU for body system provided within the vehicle, an ECU for engine system, an ECU for drive system, an ECU for running safety system and an ECU for entertainment system or the like are loaded. Each ECU 10 is constructed to execute the predetermined programs in order to control the control objects and moreover executes, as required, the data communication among the ECUs explained above via the intra-vehicle LAN 90 in order to realize optimum control for the entire part of vehicle.

The ECU 10 comprises a driver 11 and a microcomputer 12. The driver 11 connects the microcomputer 12 to the intra-vehicle LAN 90. The microcomputer 12 is the well known typical computer system. The microcomputer 12 includes a CPU 13 as the process executing means, a ROM 14 as the program storage means, a RAM 15 as the temporary storage means, a LAN block 16 and a DMA (Direct Memory Access) controller 17 as the transfer means.

The LAN block 16 includes a message box 16a, a protocol controller 16b and a filter circuit 16c.

Figure 2:
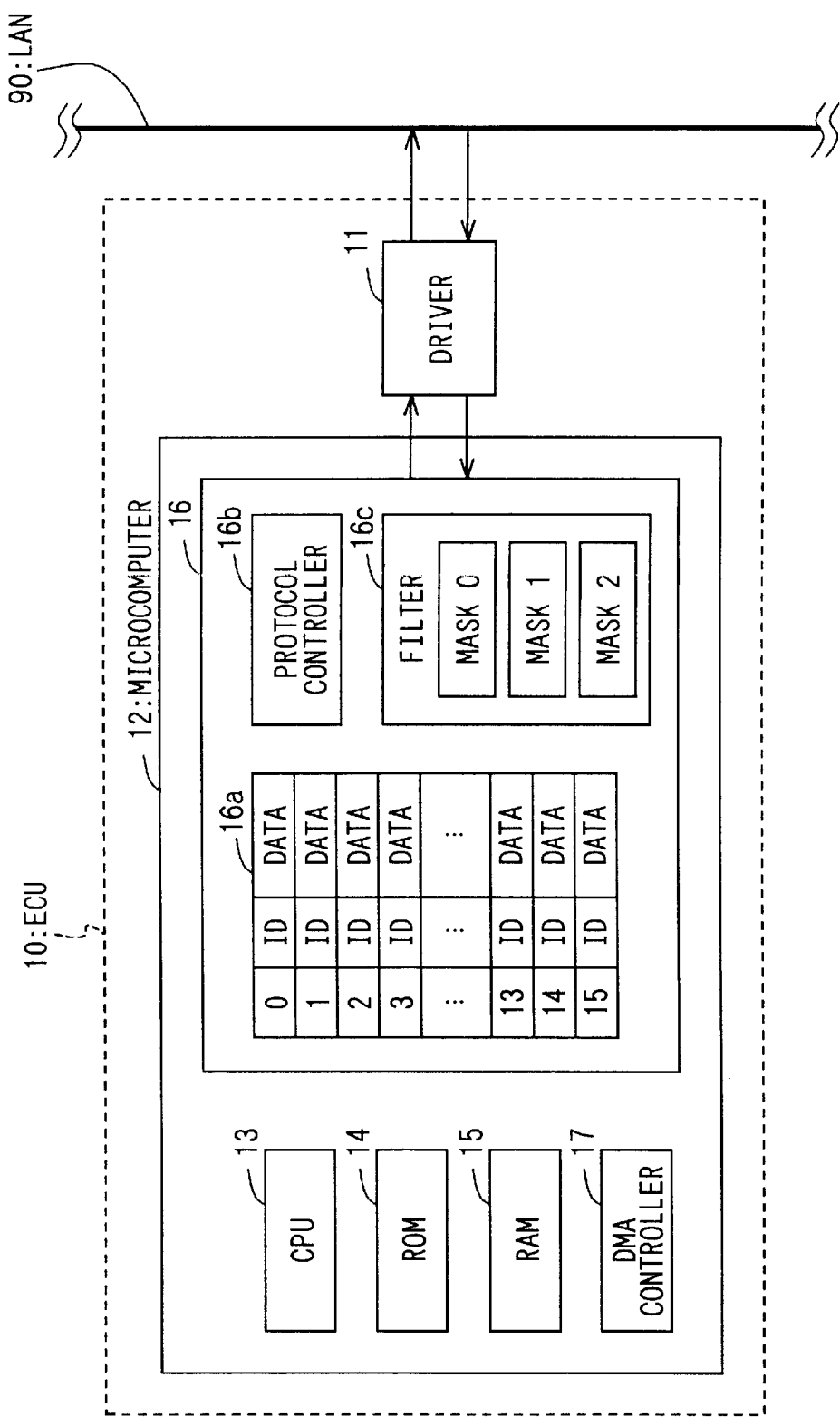
FIG. 2 is a block diagram of an electric control unit according to the first embodiment of the present invention.

The communication data to be transmitted and received via the intra-vehicle LAN 90 is constituted of identification information (ID) and data itself (DATA) and is called a message. The message box 16a is a storage region to hold a transmitting message or a receiving message. In FIG. 2, a structure to store the message is shown in correspondence between ID and DATA. Moreover, the message boxes 16a are given the numbering from "0" to "15" for identification thereof.

The protocol controller 16b executes the message process depending on the communication protocol. For example, the message stored in the message box 16a for transmission is outputted to the driver 11. In this embodiment, one message box 16a which is given the number "0" is used for transmission.

Moreover, the protocol controller 16b decodes the message received via the driver 11. The decoded message is stored in the message box 16a for reception depending on the result of selection by the filter circuit 16c. In this embodiment, fifteen message boxes 16a given the numbering from "1" to "15" are used for reception. The protocol controller 16b is the communication means, while the message box 16a is the storage region of the data storage means.

The ID is address information to identify the ECU 10 serving as the transmission source of communication data or significant information which indicates a kind of the communication data. Message selection is executed on the basis of the ID. The filter circuit 16c is constructed as a logic circuit including three filter patterns of mask 0 to mask 3. These three filter patterns are used to identify the ID and select the message. The filter circuit 16c operates as a selection means.

The filter patterns of mask 0 correspond to the thirteen message boxes 16a given the numbering from "1" to "13". The message selected based on the mask 0 is stored in the vacant message box 16a among the thirteen message boxes 16a given the numbering from "1" to "13". The filter pattern of mask 1 corresponds to the message box 16a of the number "14". The message selected based on the mask 1 is stored in the message box 16a of the number "14". The filter pattern of mask 2 corresponds to the message box 16a of the number "15". The message selected based on the mask 2 is stored in the message box 16a of the number "15".

Groups of the messages selected based on three filter patterns of the masks 0 to 3 are respectively determined taking the process priority thereof into consideration. In this embodiment, the mask corresponds to the level of the process priority. Groups of the messages having higher process priority are selected based on the mask 2, groups of the messages having intermediate process priority are selected based on the mask 0, while groups of the messages having lower process priority are selected based on the mask 1. Therefore, the messages having higher process priority are stored in the message box 16a of the number "15", the messages having intermediate process priority are stored in the message boxes 16a of the numbering from "1" to "13" and the messages having lower process priority are stored in the message box 16a of the number "14". In this embodiment, the messages having higher and intermediate process priority are defined as the first receiving messages and the messages having lower process priority as the second receiving messages.

The DMA controller 17 transfers, when the message is stored in the message box 16a of the number "14", this message to the RAM 15. Thereby, occurrence of a failure in the message fetching process for the message to be stored in the message box 16a for reception is reduced.

Figure 3:
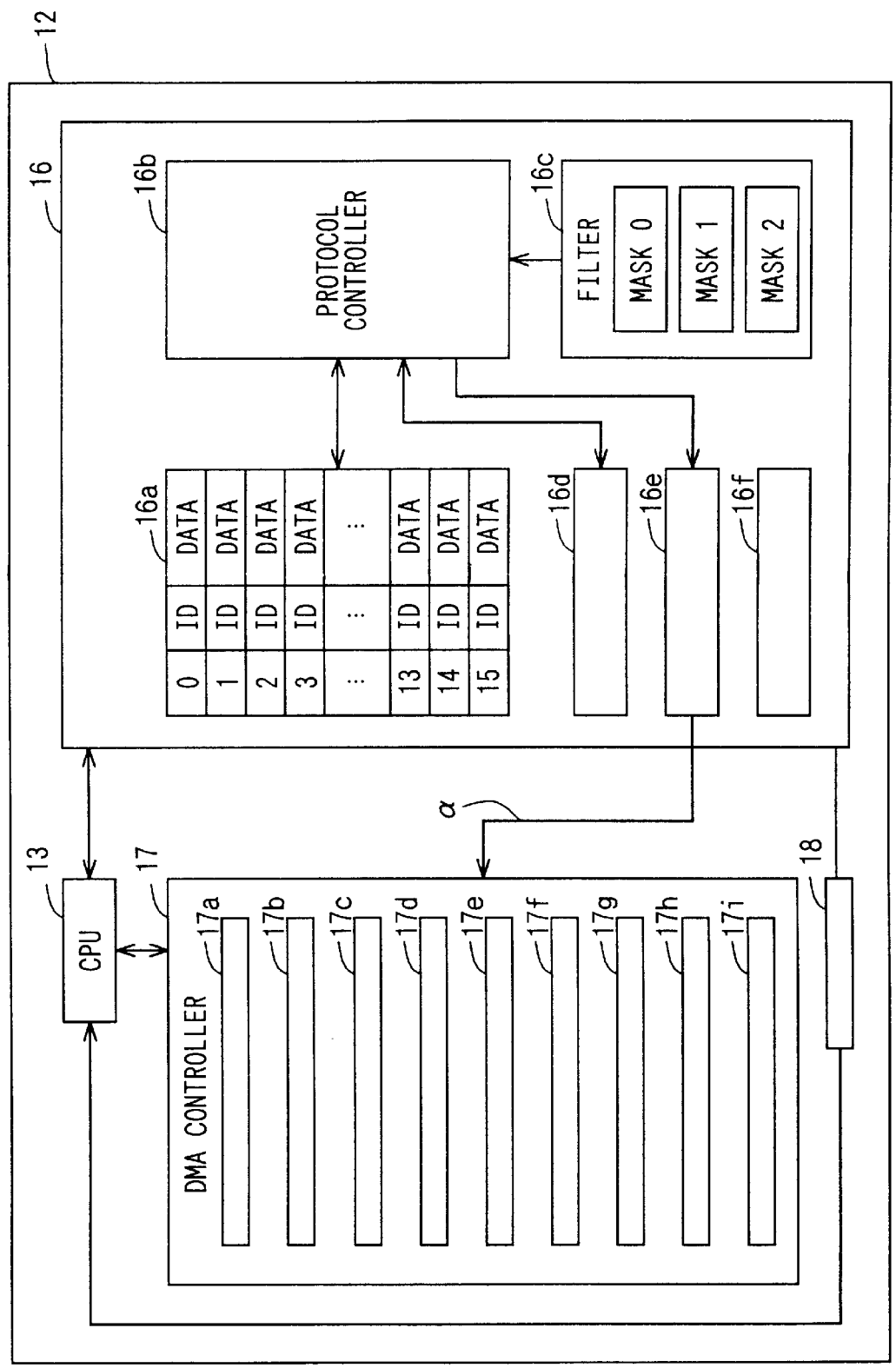
FIG. 3 is a block diagram of a microcomputer according to the first embodiment of the present invention.
Figure 4:
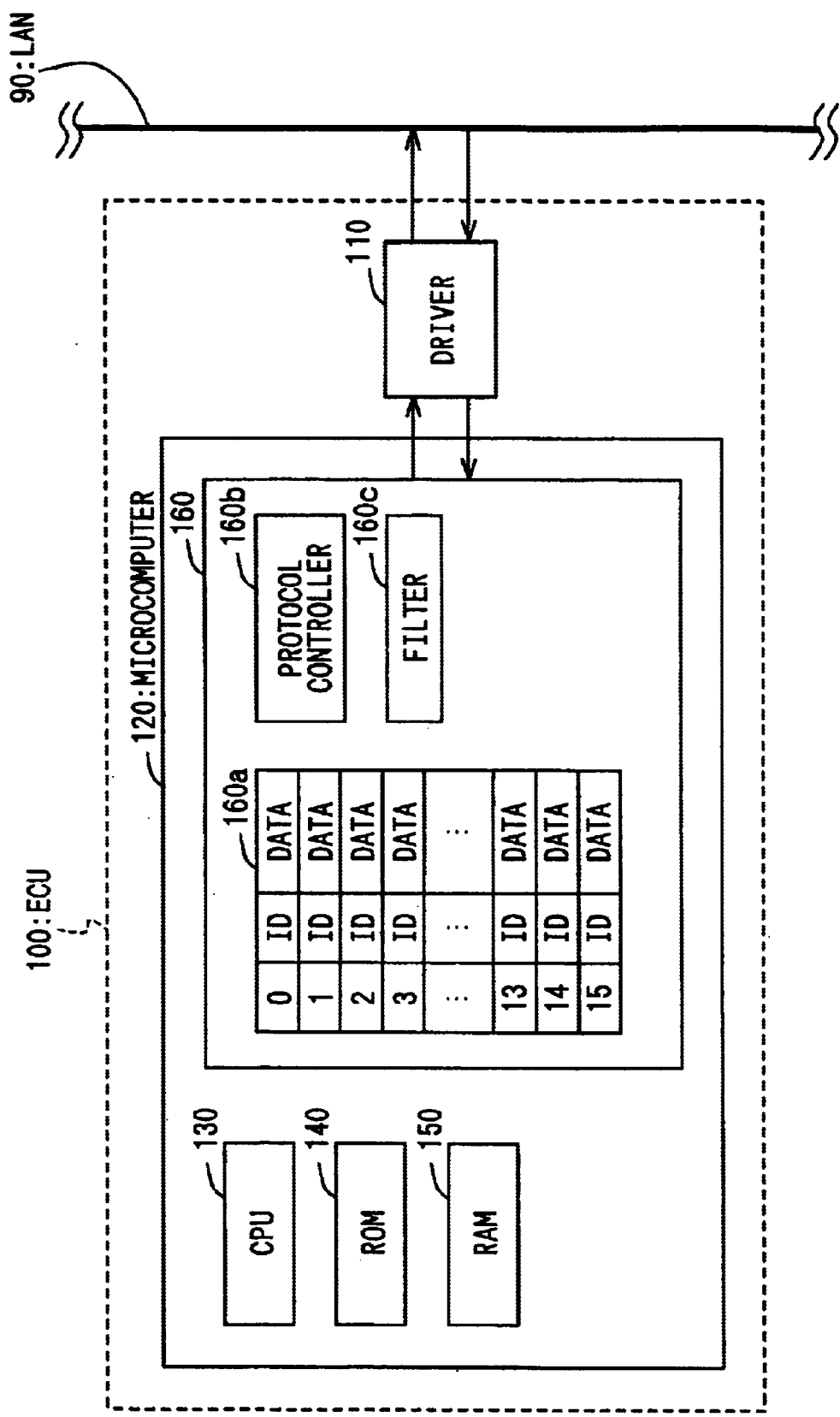
FIG. 4 is a block diagram of an electric control unit showing a conventional configuration.

Constitutions the LAN block 16 and DMA controller 17 will be explained with reference to FIG. 3. The DMA controller 17 is provided with nine registers 17a to 17i and is capable of setting various information pieces in relation to the message transfer operation. Setting of these information pieces can be changed from the CPU 13 with inclusion of the following contents.

First, selection information regarding regular transfer and LAN transfer is stored in the register 17a. When the selection information indicates the LAN transfer, transfer is executed to the RAM 15 from the message box 16a of the number "14". On the other hand, when the selection information indicates the regular transfer, the regular transfer process is carried out among the memories such as the RAM 15 or the like.

A transfer source address is stored in the register 17b. This transfer source address is a transfer source address for the regular transfer operation. To the register 17c, a transfer destination address is stored. However, this transfer destination address is used not only for the regular transfer operation bat also as a transfer destination for the LAN transfer operation. To the register 17d, the upper limit value of the number of times of transfer is stored. For example, "100" is stored. To the register 17i, the number of times of transfer operation is stored. This number of times of transfer operation is counted in every execution of the transfer operation. When the number of times of transfer operation becomes equal to the upper limit value, the DMA controller 17 stops the transfer operation.

A direction of transfer operation is stored in the register 17e. This transfer direction is information indicating that the transfer operation should be executed in the forward direction from the transfer destination address stored in the register 17c with decrement of the address. Alternatively, the transfer direction is information indicating that the transfer operation should be executed in the backward direction from the transfer destination address with increment of the address.

Information to permit/inhibit generation of an interruption during the transfer operation is stored in the register 17f. The DMA controller in this embodiment sends the preset interruption generation timing to the CPU 13. The interruption generation timing is stored in the register 17h. To be more practical, an arbitrary setting value can be stored. For example, two values of "50" which is equal to a half of the upper limit value and "100" which is equal to the upper limit value may be set as the setting value. Moreover, the DMA controller 17 outputs, when the number of times of transfer operation in the register 17i becomes equal to the setting value, an interruption signal is sent to the CPU 13 when the number of transfer operations becomes equal to the setting value.

Transfer source information for identifying the message box 16a of the transfer source is stored in the register 17g. This information is used in the LAN transfer explained above. In this embodiment, the information to identify the message box 16a of the number "14" is stored in the register 17g.

The LAN block 16 stores transmission/reception operation information 16d, transmission/reception condition information 16e and interruption permission/inhibition information 16f. Next, a relationship between these information pieces and the message box 16a, protocol controller 16b and filter circuit 16c will be explained.

The transmission/reception operation information 16d indicates the message boxes used for transmission and reception among the sixteen message boxes 16a. The transmission/reception condition information 16e is flag information indicating the end of transmission at the message boxes 16a for transmission and the end of reception at the message boxes 16a for reception. When a flag indicating die end of transmission is set, it means that the message read from the message box 16a is transmitted by the protocol controller 16b, while when a flag indicating the end of reception is set, it means that the receiving message is stored into the message box 16a by the protocol controller 16b. Therefore, it is possible to identify the message box 16a to which the receiving message is stored by this transmission/reception condition information 16e. The DMA controller 17 is connected with a signal line shown with a code a in order to monitor the transmission/reception condition information 16e.

The interruption permission/inhibition information 16f is flag information indicating that an interruption to the CPU 13 should be generated or not at the end of the transmission/reception of each message box 16a. The LAN block 16 executes the AND operation for the flag information of the transmission/reception condition information 16e and the interruption permission/inhibition information 16f and outputs a result of this AND operation to an interruption generation circuit 18. Thereby, only when generation of interruption is permitted, an interruption signal is outputted to the CPU 13 at the end of the transmission/reception of a message.

Next, an operation to fetch a message from the message box 16a in the microcomputer 12 will be explained.

First, the CPU 13 executes the initialization process. The CPU 13 outputs information for selecting the LAN transfer to the DMA controller 17. This information is stored in the register 17a. The CPU 13 sends an instruction to permit transfer operation to the DMA controller 17. Thereby, the DMA controller 17 enters the transfer ready condition.

The CPU 13 reads the receiving messages of the message boxes 16a of the numbers "1" to "13" and "15" and then stores the messages to the RAM 15 shown in FIG. 2 in order to execute the processes based on these messages.

Therefore, the CPU 13 can execute the processes without any failure in the message fetching process for the receiving data.

On the other hand, the DMA controller 17 monitors the transmission/reception condition information 16e of the LAN block 16 for the message box 16a of the number "14". Therefore, when a message is stored, the DMA controller 17 transfers this message to the RAM 15. In more detail, the message is transferred in the direction stored in the register 17e from the transfer destination address stored in the register 17c. Successively, a message is transferred repeatedly whenever a new message is stored in the message box 16a of the number "14" until the number of times of transfer reaches the upper limit value, for example, "100" stored in the register 17d. The DMA controller 17 stops the transfer process when the CPU 13 issues an instruction to stop the transfer process.

The CPU 13 never reads a message from the message box 16a in regard to the message stored in the message box 16e of the number "14" but reads such message after it is transferred from the RAM 15 and thereafter executes the processes based on such message. This process is not always executed whenever the data of lower process priority is received but is executed periodically or irregularly in the interval of the upper limit value or less.

The ECU 10 of this embodiment is constructed to store the messages corresponding to the upper limit value of the number of times of transfer process, for example, "100" messages by transferring the messages of the lower process priority to be stored in the message box 16a of the number "14" to the RAM 15 from the DMA controller 17. That is, virtual expansion of the message box 16a is realized by the transfer from the DMA controller 17 to the RAM 15. Thereby, generation of failure in the message fetching process for the received messages is reduced by increasing the number of message boxes 16a of the LAN block 16. As a result, the ECU 10 can faithfully execute the control based on the message and thereby prevents deterioration of the control performance thereof.

In this embodiment, the DMA controller 17 is required and this DMA controller 17 can be flexibly used for the other data transfer processes by updating the selection information in the register 17a. This flexibility is a benefit from the point of view of cost. The microcomputer comprising the DMA controller 17 is already put into the practical use and is easily available in the market. This embodiment provides a large benefit from the viewpoint of manufacturing cost in the characteristic that functions may be expanded through improvement of software using the existing microcomputer.

Moreover, in this embodiment, the upper limit value of the number of times of transfer process can be stored in the register 17d of the DMA controller 17 and when the number of times of transfer process stored in the register 17i reaches the upper limit value, the transfer operation is automatically stopped. In addition, when the number of times of transfer process reaches the setting value stored in the register 17h under the precondition that generation of interruption is permitted by the information in the register 17f, this condition is sent to the CPU 13. Thereby, when the CPU 13 issues an instruction to stop the transfer process, the DMA controller 17 stops the transfer process. Moreover, only when the CPU 13 has issued an instruction to permit the transfer process, the DMA controller 17 enters the transfer ready state. With these processes, the transfer process can be stopped in the course of the process when an inadequate transfer process is executed based on any uncertain factor.

As a result, the storage region of the RAM 15 is no longer requested by the transfer process.

Here, it is possible to limit the number of times of transfer process to the storage region of the transfer destination RAM, instead of limiting the number of times of transfer process to the upper limit value. Moreover, it is possible to introduce a construction in which the notification to the CPU is not executed even when the number of times of transfer process reaches the setting value.

Here, the present invention is never restricted with such embodiment and can be embodied in various profiles without departure from the subject matter thereof.

The present invention can be adapted to a microcomputer to store the messages received from the network into the message boxes even when it is loaded to an object other than a vehicle.

Although the present invention has been described in connection with the preferred embodiments thereof with reference to the accompanying drawings, it is noted that various changes and modifications will be apparent to those skilled in the art. Such changes and modifications are to be understood as being included within the scope of the present invention as defined in the appended claims.

What is claimed is:

1. A microcomputer comprising:
    a communication means for receiving at least communication data from a network;
    a data storage means including a predetermined number of storage regions to store communication data received by the communication means;
    a process executing means for executing processes based on the communication data stored in the data storage means;
    a temporary storage means in communication with the process executing means for storing data; and
    a transfer means for transferring, without using the process executing means, the communication data stored in a particular storage region of the data storage means to the temporary storage means in such a manner that storage regions in the temporary storage means are not overlapped,
    wherein the process executing means executes the processes based on the communication data stored in the temporary storage means instead of the communication data stored in the particular storage region of the data storage means.

2. A microcomputer according to claim 1, wherein the transfer means is a DMA controller.

3. A microcomputer according to claim 1, wherein the transfer means limits a number of times of transfer of the communication data.

4. A microcomputer according to claim 3, wherein the transfer means stops transfer of the communication data stored in the particular storage region of the data storage means to the temporary storage means when the number of times of transfer reaches an upper limit value.

5. A microcomputer according to claim 3, wherein the transfer means sends information to the process executing means when the number of times of transfer reaches a preset value.

6. A microcomputer according to claim 1, wherein the transfer means stops transfer of the communication data stored in the particular storage region of the data storage means to the temporary storage means when the transfer means is instructed by the process executing means to stop the transfer.

7. A microcomputer according to claim 1, wherein the transfer means enters a transfer ready condition when the transfer means is permitted to transfer the communication data stored in the particular storage region of the data storage means to the temporary storage means.

8. A microcomputer according to claim 1, wherein information to identify the particular storage region of the data storage means is set as transfer source information and the transfer means transfers the communication data when the communication data is stored in the particular storage region identified by the transfer source information.

9. A microcomputer according to claim 1, wherein communication data halving a relatively lower process priority is stored in the particular storage region.

10. A microcomputer according to claim 1, wherein the communication data is constituted of identification information to identify a transfer source apparatus or a kind of data and a main part of data and there is further provided a selecting means for selecting the communication data depending on the identification information.

11. A microcomputer according to claim 1, wherein the communication means transmits communication data to the network.

12. A microcomputer according to claim 1, wherein the network is an intra-vehicle LAN.

13. A communication data processing method, in which a plurality of kinds of communication data received from a network is stored into a message box as received data and a processing means executes processes depending on the received data, comprising:

identifying the received data as a first data type or a second data type;

temporarily storing the received data of the first data type by over-writing to a first message box whenever the received data of the first data type is received;

reading the received data of the first data type stored temporarily in the first message box by the processing means and executing a first process by the processing means based on the received data of the first data type;

temporarily storing the received data of the second data type by over-writing a second message box whenever the received data of the second data the is received;

storing a plurality of the received data of the second data type by transferring, directly and sequentially, the received data of the second data type in a plurality of memory regions without using the processing means; and executing a second process by the processing means based on the received data of the second data type in the memory region.

14. A communication data processing method according to claim 13, wherein the first process is executed whenever the received data of the first data type is received and the second process is executed periodically when the received data of the second data type is received.

15. A communication data processing method according to claim 14, wherein the first process is executed in preference to the second process.

16. A communication data processing method according to claim 13, wherein the amount of the received data of the second data type to be accumulated has an upper limit.

* * * * *